United States Patent
Ito

(10) Patent No.: US 10,904,424 B2
(45) Date of Patent: Jan. 26, 2021

(54) IMAGE CAPTURING APPARATUS

(71) Applicant: CANON KABUSHIKI KAISHA, Tokyo (JP)

(72) Inventor: Shigeyoshi Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/502,218

(22) Filed: Jul. 3, 2019

(65) Prior Publication Data

US 2020/0014839 A1 Jan. 9, 2020

(30) Foreign Application Priority Data

Jul. 6, 2018 (JP) .................................. 2018-129459
Jun. 4, 2019 (JP) .................................. 2019-104796

(51) Int. Cl.
*H04N 5/232* (2006.01)
*H04N 5/217* (2011.01)
*H04N 5/341* (2011.01)
*H04N 5/77* (2006.01)

(52) U.S. Cl.
CPC ....... *H04N 5/23212* (2013.01); *H04N 5/2178* (2013.01); *H04N 5/341* (2013.01); *H04N 5/772* (2013.01)

(58) Field of Classification Search
CPC .... H04N 5/23212; H04N 5/772; H04N 5/341; H04N 5/2178; H04N 5/343; H04N 5/36961; H04N 5/374
See application file for complete search history.

(56) References Cited

U.S. PATENT DOCUMENTS

2007/0177015 A1* 8/2007 Arakawa ................ H04N 7/181
348/159
2015/0256778 A1* 9/2015 Kusaka .................. G03B 13/36
348/302
2018/0077337 A1* 3/2018 Fujii .................. H04N 5/23212

FOREIGN PATENT DOCUMENTS

JP 2016-072695 A 5/2016

* cited by examiner

*Primary Examiner* — Yogesh K Aggarwal
(74) *Attorney, Agent, or Firm* — Cowan, Liebowitz & Latman, P.C.

(57) ABSTRACT

An image capturing apparatus comprises a pixel unit, a driver that drives the pixel unit, a memory that stores image data output from the pixel unit, and at least one image processor that performs a first operation which uses a first image data and a second operation for obtaining an image using the image data, and a controller that controls transfer of the image data to the memory and the image processor. The controller controls so that after the first image data is transferred to the image processor, second image data of the image data is transferred to the image processor, and the driver drives the pixel unit so as to output the image data in a predetermined order which is different from an order of transferring the first image data and the second image data to the image processor.

11 Claims, 12 Drawing Sheets

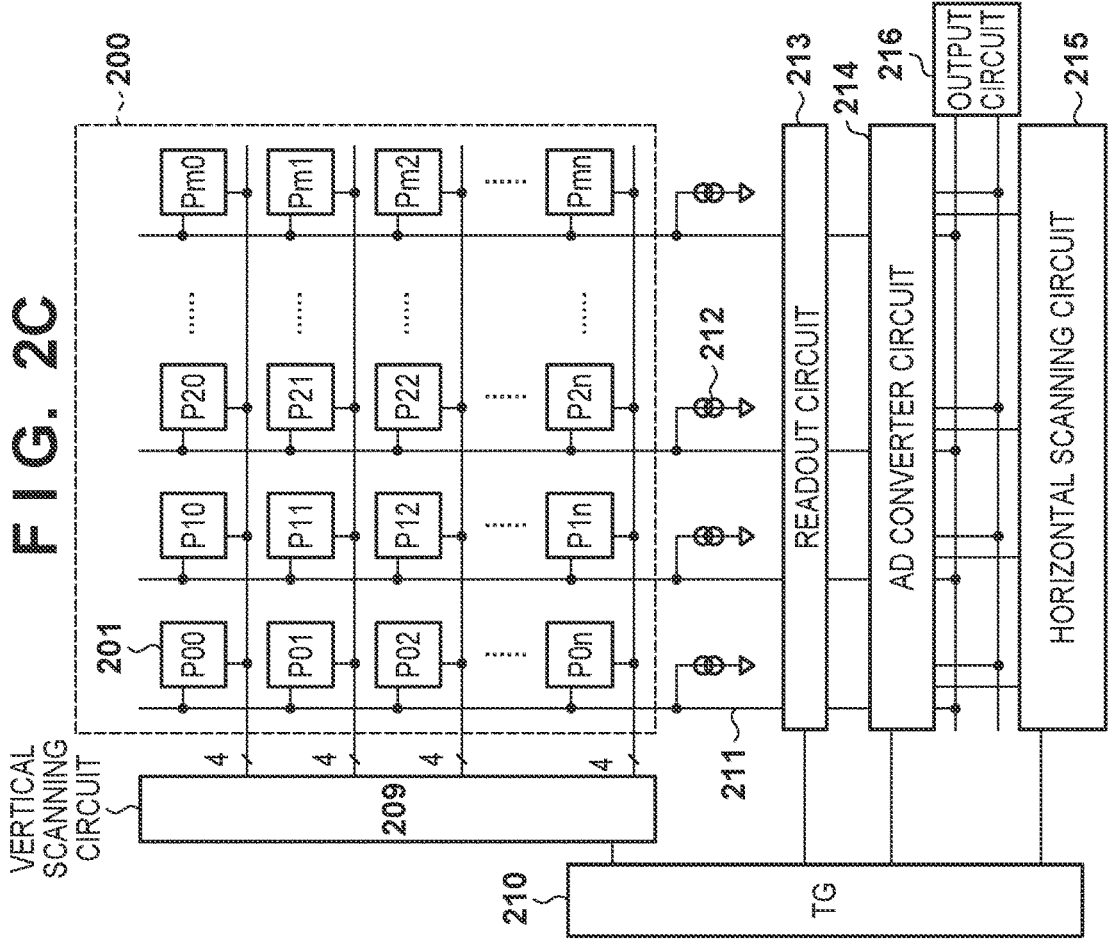
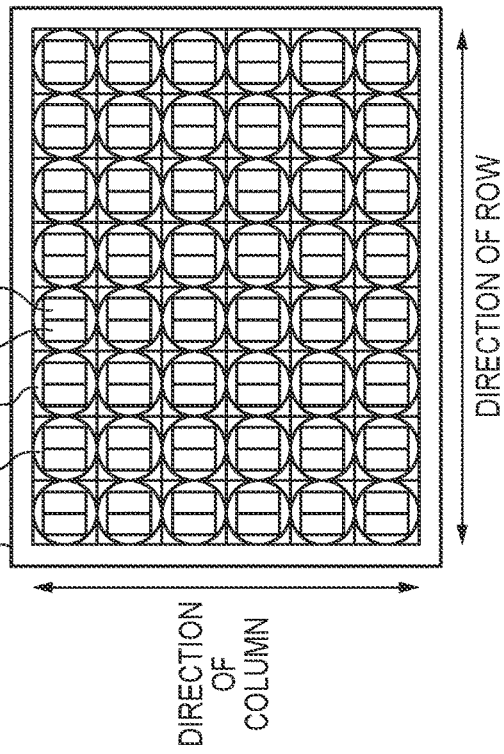
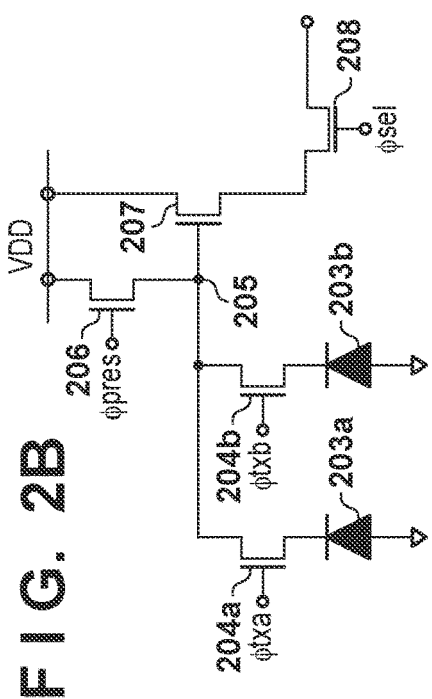

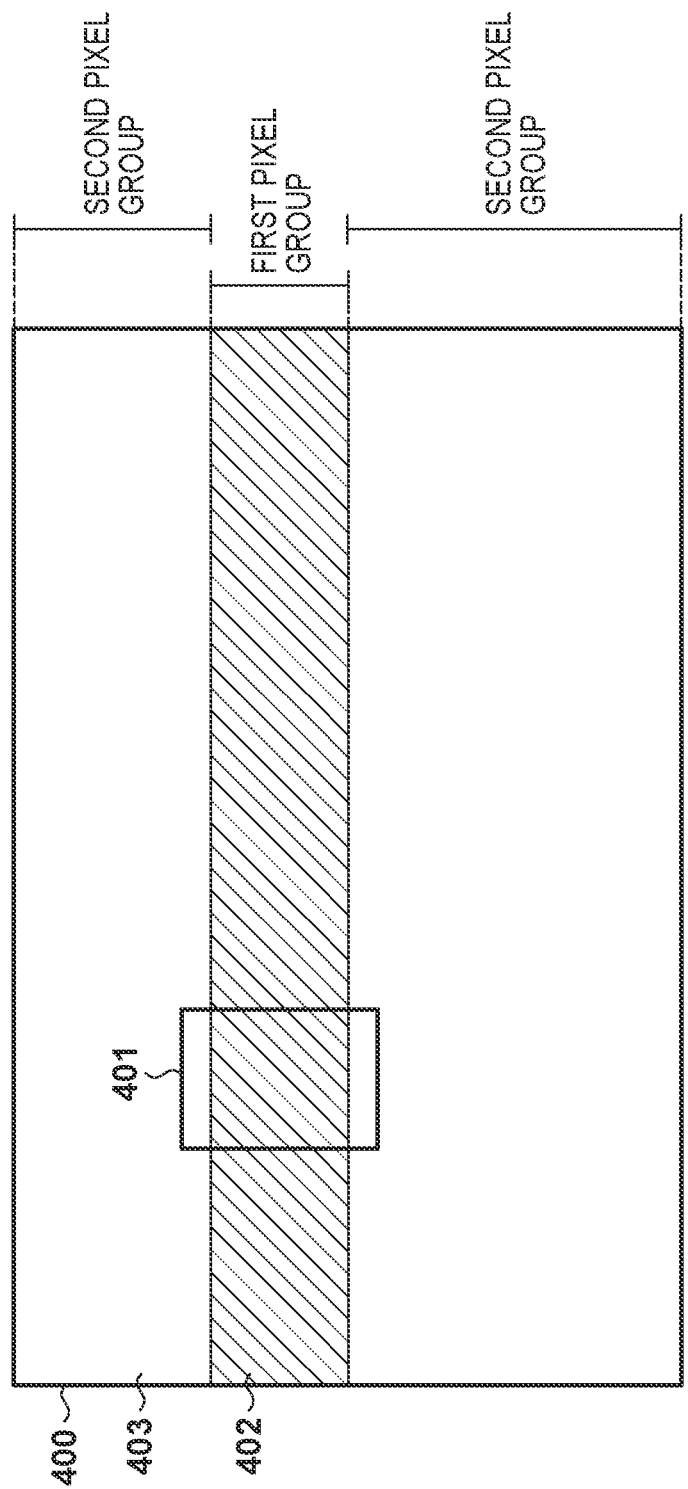

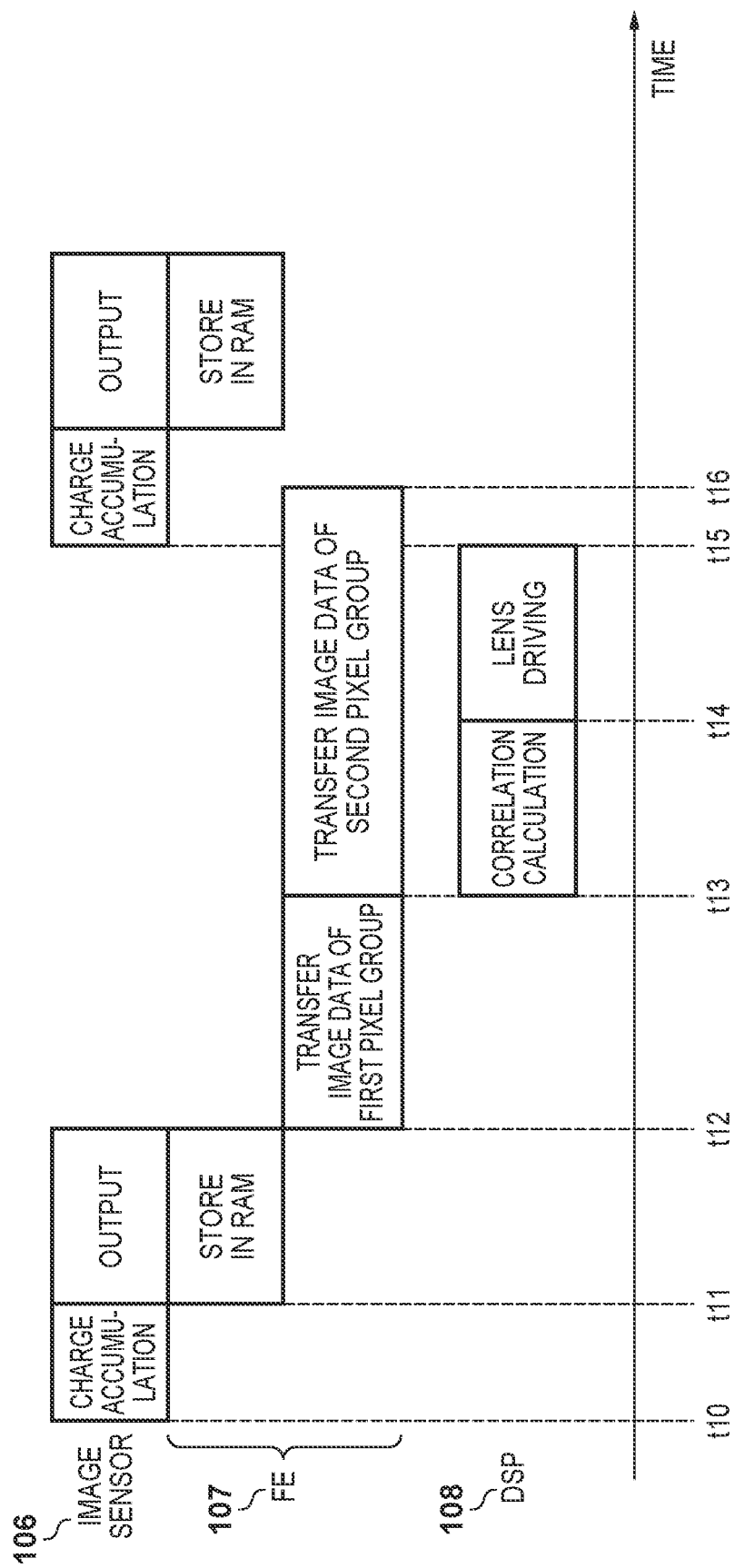

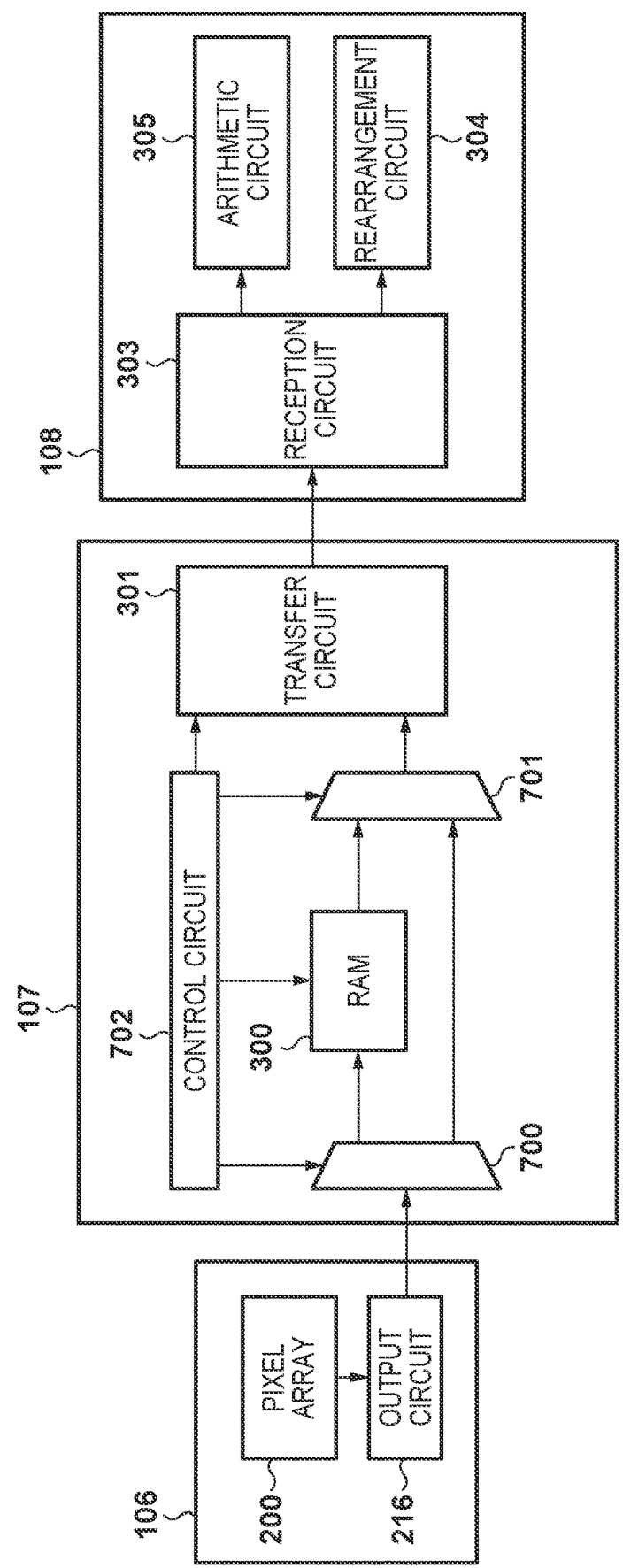

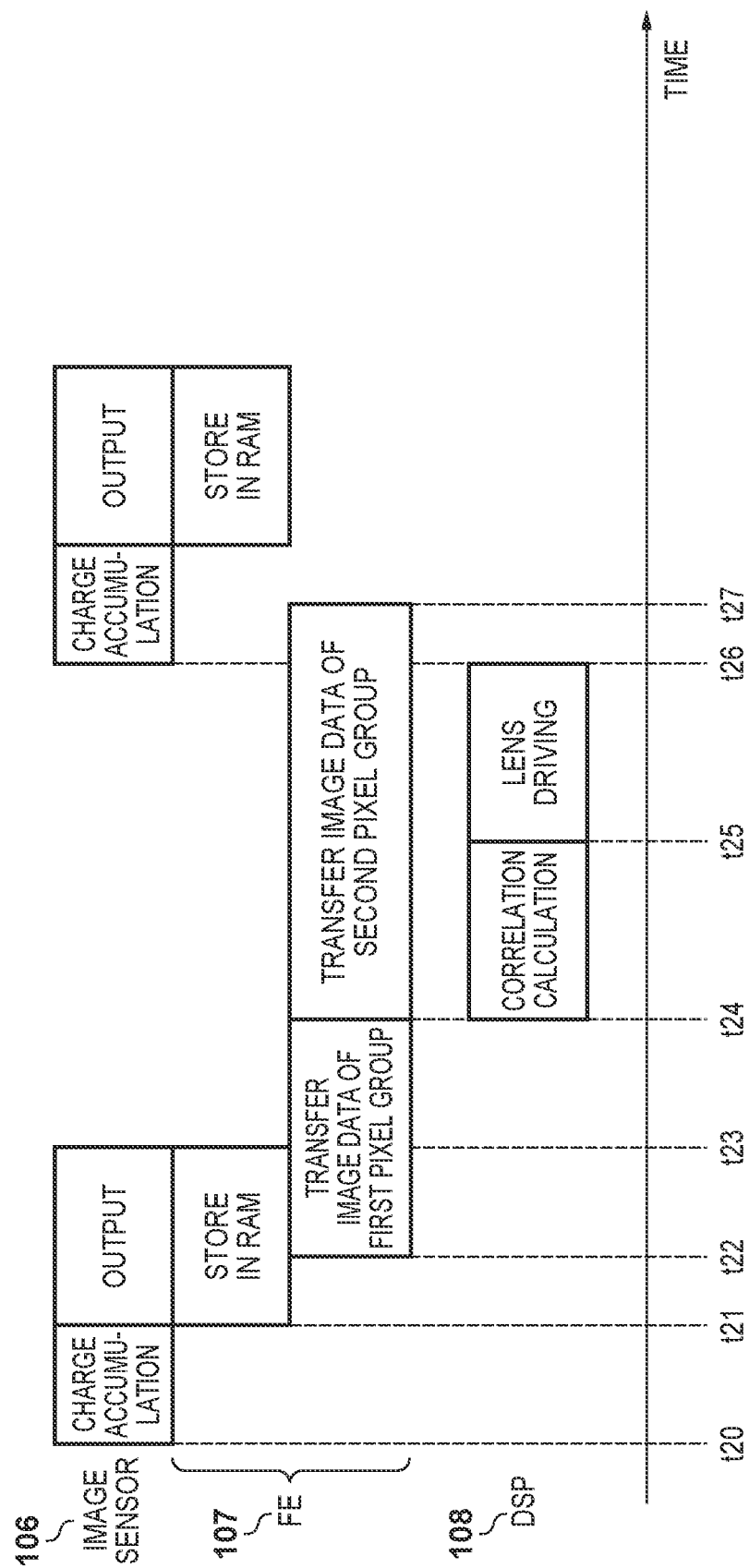

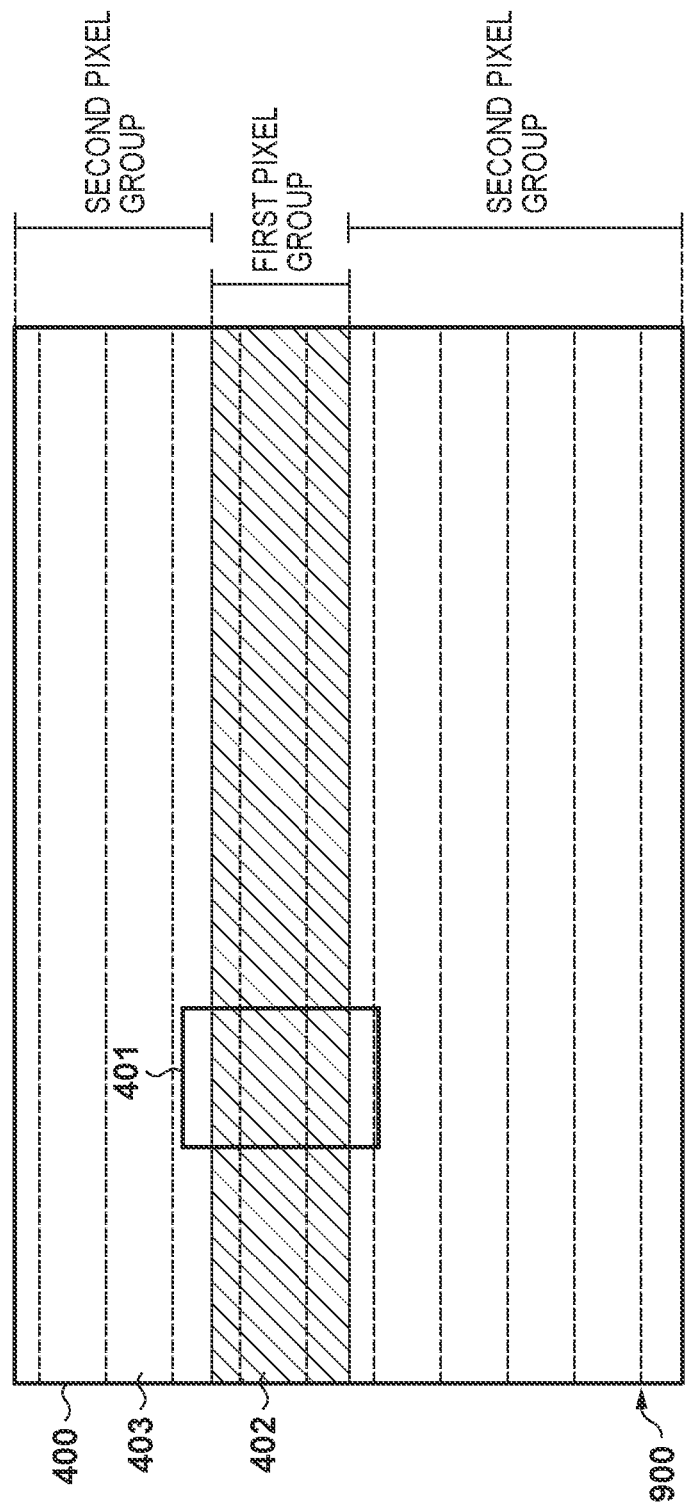

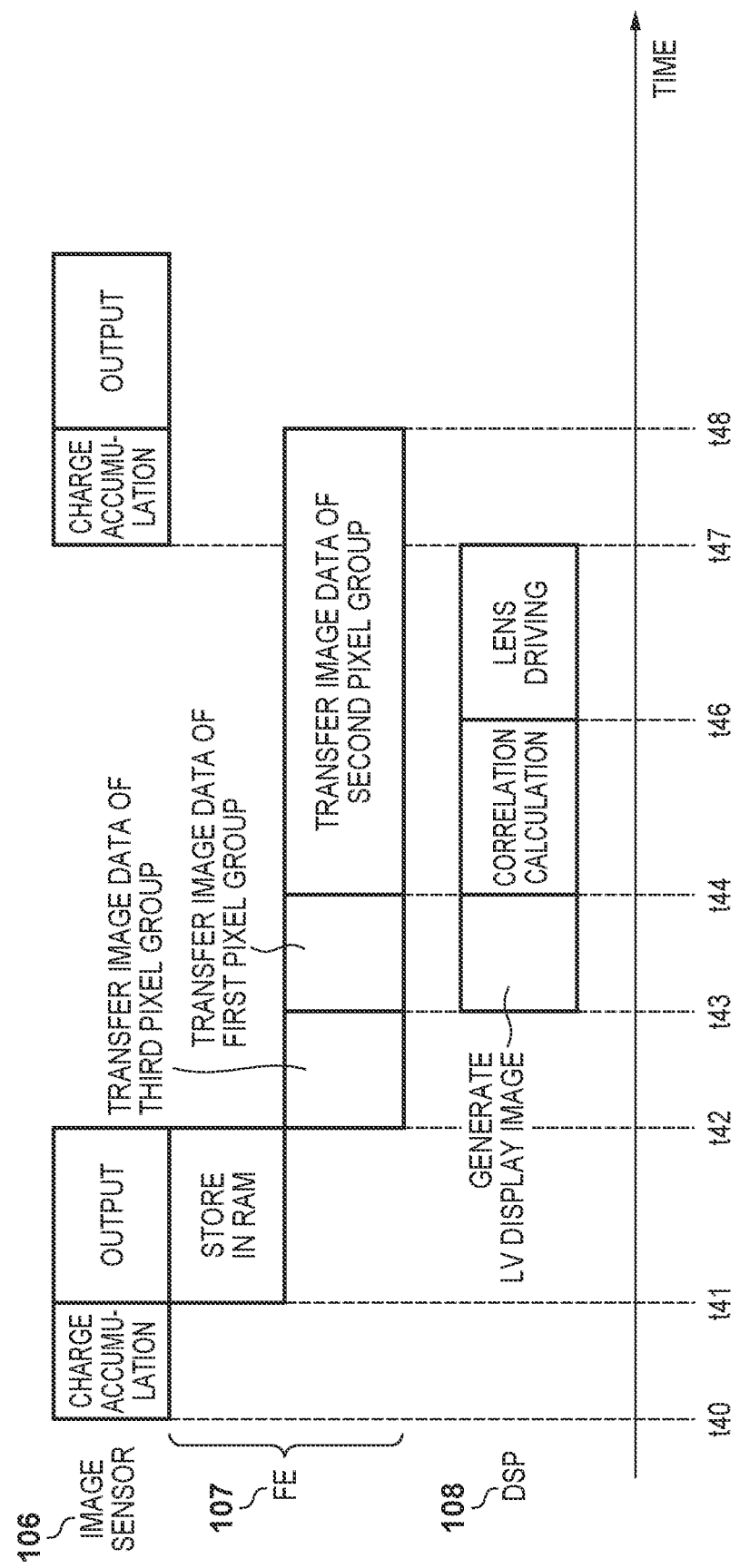

IMAGE CAPTURING APPARATUS

BACKGROUND OF THE INVENTION

Field of the Invention

The present invention relates to an image capturing apparatus.

Description of the Related Art

As digital cameras have become more sophisticated, the types of calculations performed based on pixel signals obtained from an image sensor are increasing. The information obtained from these calculations is used, for example, for driving a lens in auto focus (AF) control. Since the frame rate of the camera at the time of continuous shooting can be improved by driving lens at high speed, it is necessary to finish the calculation as fast as possible. Therefore, various methods have been proposed for reducing the time taken to complete the calculations.

For example, Japanese Patent Laid-Open No. 2016-72695 discloses an image capturing apparatus having a configuration in which focus detection pixels are present in part of a pixel array, that switches between a first mode and a second mode and outputs signals from the pixels. First, in the first mode, signals are output in the order in which the pixels are arranged. On the other hand, in the second mode, signals are output first from the focus detection pixels in a focus detection area and their peripheral pixels, then the signals are output from the remaining pixels. With this configuration, in the second mode, since the signals of the focus detection pixels can be output at earlier timing compared to the first mode, it is possible to complete the subsequent focus detection calculation and the subsequent driving of a focus lens at earlier timing compared to the first mode.

As described above, in the prior art disclosed in Japanese Patent Laid-Open No. 2016-72695, in the second mode, the order of image signals is different from the order of arrangement of the pixels. Accordingly, when shooting a moving subject with an electronic shutter method in which signals are sequentially output from pixels while a mechanical shutter is open, the following problem occurs. That is, in a case where the focus detection area is not in contact with the upper side of the screen and the signals are output from the focus detection pixels in the focus detection area first, exposure timing (charge accumulation) differs in the upper and lower areas of the focus detection area. As a result, an image becomes unnatural since discontinuity occurs at the upper and lower boundaries of the focus detection area.

SUMMARY OF THE INVENTION

The present invention has been made in consideration of the above situation, and, in a case where an image is shot with an electronic shutter method, reduce unnaturalness in a captured image while reducing the time taken to complete a calculation based on signals obtained from a plurality of pixels.

According to the present invention, provided is an image capturing apparatus comprising: a pixel unit that has a plurality of pixels each having a plurality of photoelectric conversion portions and one microlens; and one or more processors and/or circuitry which functions as: a driver that drives the pixel unit; a memory that stores image data output from the pixel unit; at least one image processor that performs a first operation and a second operation, wherein the first operation includes a calculation which uses first image data that is part of the image data, and the second operation includes processing, performed on the image data, for obtaining an image; and a controller that controls transfer of the image data output from the pixel unit to the memory and the image processor, wherein the controller controls so that after the first image data is transferred to the image processor, second image data, other than the first image data, of the image data output from the pixel unit is transferred to the image processor, and the driver drives the pixel unit so as to output the image data in a predetermined order which is different from an order of transferring the first image data and the second image data to the image processor.

Further, according to the present invention, provided is an image capturing apparatus comprising: a pixel unit that has a plurality of pixels each having a plurality of photoelectric conversion portions and one microlens; and one or more processors and/or circuitry which functions as: a driver that drives the pixel unit; a memory that stores image data output from the pixel unit; at least one image processor that performs a first operation and a second operation, wherein the first operation includes a calculation which uses first image data that is part of the image data output from the pixel unit, and the second operation includes processing, performed on the image data output from the pixel unit, for obtaining an image; and a controller that controls transfer of the image data output from the pixel unit to the memory and the image processor, wherein the controller controls to store all the image data output from the pixel unit in the memory, transfer the first image data to the image processor while storing the first image data in the memory, and after transferring the first image data, transfer the first and second image data to the image processor from the memory in a predetermined order, and the driver drives the pixel unit so as to output the image data in a predetermined order which is different from an order of transferring the first image data and the second image data to the image processor.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A to 2C are diagrams showing a configuration of an image sensor according to the embodiments;

FIG. 4 is a diagram showing an example of distribution of a first pixel group and a second pixel group in the pixel array according to the first embodiment and a second embodiment;

FIG. 5 is a timing chart showing processing according to the first embodiment;

FIG. 7 is a block diagram showing an internal configuration of an image sensor, a front end, and a DSP according to the second embodiment;

FIG. 8 is a timing chart showing processing according to the second embodiment;

FIG. 11 is a diagram showing an example of distribution of a first pixel group and a second pixel group in the pixel array according to the third embodiment; and FIG. 12 is a timing chart showing processing according to the third embodiment.

DESCRIPTION OF THE EMBODIMENTS

Exemplary embodiments of the present invention will be described in detail in accordance with the accompanying drawings.

First Embodiment

Figure 1:
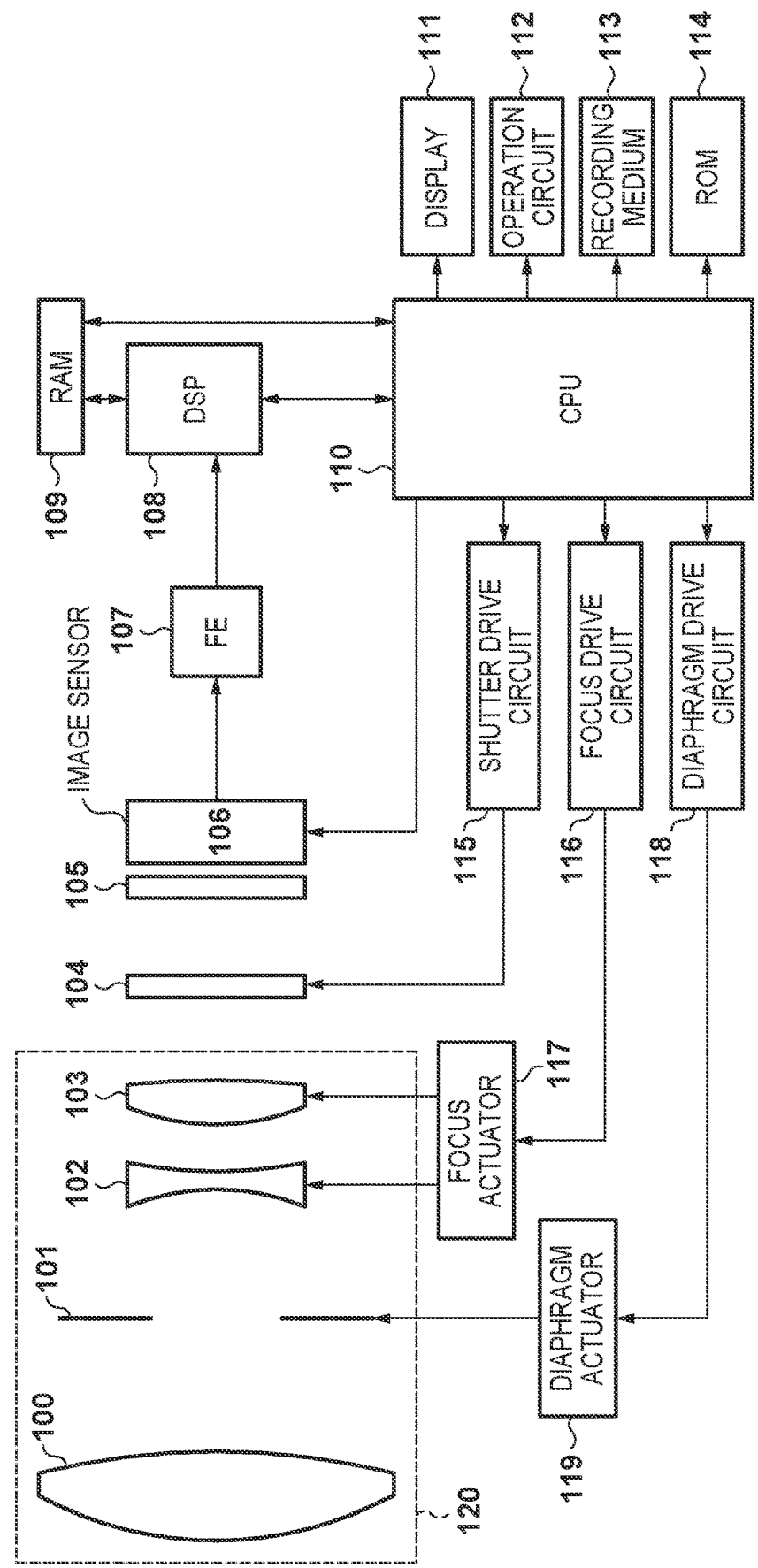
FIG. 1 is a block diagram showing a configuration of an image capturing apparatus according to embodiments of the present invention.

FIG. 1 is a block diagram showing a configuration of an image capturing apparatus according to a first embodiment of the present invention. In FIG. 1, a first lens 100 is disposed at the tip of an imaging optical system 120. A diaphragm 101 adjusts a light amount at the time of shooting by adjusting its aperture diameter. A second lens 102 and a third lens 103 are driven by a focus actuator 117, and adjust the focus of the imaging optical system 120 by moving back and forth in the optical axis direction.

A focal plane shutter 104 adjusts an exposure period at the time of shooting a still image. An optical low pass filter 105 is used to reduce false color and moiré of a shot image. An image sensor 106 photoelectrically converts an optical image of a subject formed by the imaging optical system 120 into an electrical signal. A front end (FE) 107 incorporates a memory and a transfer unit, receives image data from the image sensor 106, stores a part or all of the image data in the memory, and transmits it to a digital signal processor (DSP) 108 provided downstream of the FE 107.

The DSP 108 performs predetermined image processing. That is, the DSP 108 performs processing such as correction and compression on the image data captured by the image sensor 106 and transmitted from the front end 107. It also has a separation function that separates the transmitted image data into A image data and B image data that have a phase difference as described later, and a correlation calculation function that performs correlation calculation using the A image data and B image data. Further, processing such as processing image data to be displayed on a display 111, and recording image data on a recording medium 113, is performed. Details of signal processing in the image sensor 106, the front end 107, and the DSP 108 will be described later.

A RAM 109 has a function of holding output data from the front end 107, a function of storing image data processed by the DSP 108, and a function as a work memory when a CPU 110 operates. Note that, instead of RAM, another type of memory may be used as long as the memory has a sufficiently fast access speed and no problem in operation. Further, in the present embodiment, the RAM 109 is disposed outside the DSP 108 and the CPU 110, but a part or all of the functions of the RAM 109 may be incorporated in the DSP 108 or the CPU 110.

The display 111 displays still images, moving images, menus, and the like processed by the DSP 108. An operation circuit 112 is used to input a shooting instruction, setting of shooting conditions, and the like to the CPU 110. The recording medium 113 is a removable recording medium for recording still image data and moving image data, and a ROM 114 stores a program that the CPU 110 loads and executes to control the operation of each unit.

The CPU 110 executes a program for controlling the respective units of the image capturing apparatus, and performs overall control of the image capturing apparatus. The CPU 110 also has a function of controlling a focus drive circuit 116 and adjusting the focus of the imaging optical system 120 using the result of the correlation calculation output from the DSP 108. The focus drive circuit 116 controls the focus actuator 117 based on an instruction from the CPU 110 to drive the second lens 102 and the third lens 103 back and forth in the optical axis direction to perform focusing.

Further, the CPU 110 controls a shutter drive circuit 115 and a diaphragm drive circuit 118 based on the photometric result by a known photometric method and the setting from the operation circuit 112. Based on an instruction from the CPU 110, the shutter drive circuit 115 drives and controls the focal plane shutter 104, and the diaphragm drive circuit 118 controls a diaphragm actuator 119 to control the aperture of the diaphragm 101.

Next, the configuration of the image sensor 106 according to the present embodiment will be described with reference to FIGS. 2A to 2C. FIG. 2A is a diagram showing a pixel array (pixel area) 200 of the image sensor 106. As shown in FIG. 2A, in the pixel array 200, a plurality of unit pixels 201 are arranged in a matrix. Each unit pixel 201 has one microlens 202 and two photodiodes (PD) 203a and 203b as photoelectric conversion parts below each microlens 202.

FIG. 2B is a diagram for explaining the detailed circuit configuration of the unit pixel 201. In FIG. 2B, PD 203a and PD 203b are PDs that constitute the unit pixel 201 under the same microlens described above. A transfer switch 204a is controlled by a signal ϕtxa, and a transfer switch 204b is controlled by a signal ϕtxb. The charges stored in the PDs 203a and 203b can be transferred to the floating diffusion portion (FD) 205 by setting the signals ϕtxa and ϕtxb to High (hereinafter, High is referred to as "H"). Since ON/OFF of the transfer switches 204a and 204b can be controlled independently, the charges accumulated in the PDs 203a and 203b can be transferred independently.

A reset switch 206 is a switch for initializing the FD 205 and is controlled by a signal ϕpres. A pixel amplifier transistor 207 is connected to a constant current source 212 described later via a selection switch 208 and a vertical output line 211 described later. When an signal ϕsel input to the selection switch 208 becomes H, the pixel amplifier transistor 207 is connected to the constant current source 212 to form a pixel amplifier. Since the FD 205 is connected to this pixel amplifier, the charges transferred from the PDs 203a and 203b to the FD 205 are converted into voltage values according to the amount of charge by the pixel amplifier, and output to the vertical output line 211 as pixel signals.

In the unit pixel 201 having such a configuration, images of light fluxes which have passed through different pupil regions are formed by the microlens 202 on two PDs 203a and 203b that constitute a unit pixel. Then, a signal (A+B signal) obtained by adding signals corresponding to the charges generated in the two PDs 203a and 203b is used as an image signal, and two signals corresponding to the charges generated in each of the individual PDs 203a and 203b (A signal, B signal) are used as an AF signal (focus detection signal).

The image signal and the AF signals may be output respectively, but signals may be output as follows in consideration of the processing load. That is, an image signal (A+B signal) and an AF signal of one of the PDs 203a and 203b (for example, A signal) are output, and the difference between the image signal and the AF signal is taken to obtain the other AF signal (for example, B signal) having parallax. Alternatively, the AF signals (A signal and B signal) of the PDs 203a and 203b are output, and the output signals are added to obtain an image signal (A+B signal).

Then, by combining the plurality of A signals and the plurality of B signals output from the plurality of pixels, a pair of image data (A image data, B image data) to be used for AF by the on-imaging plane phase difference detection method (referred to as "on-imaging plane phase difference AF", hereinafter) are obtained. The DSP 108 described later performs a correlation calculation on the pair of image data to calculate a phase difference (hereinafter referred to as an "image shift amount") which is a shift amount of the pair of image data, and further calculates a defocus amount and defocus direction of an imaging optical system from the image shift amount.

In this embodiment, each pixel includes one microlens 202 and two PDs 203a and 203b, but the number of photodiodes is not limited to two, and may be more than two. Also, the pupil division direction is not limited to the horizontal direction, and may be the vertical direction. In addition, a plurality of pixels in which positions of opening areas of light receiving units are different with respect to the microlens 202 may be provided. That is, any configuration may be used as long as two or more signals which can be used for phase difference detection can be obtained as a result.

Further, the present invention is not limited to the configuration in which all the pixels have a plurality of photodiodes as shown in FIG. 2A, and the configuration may be such that focus detection pixels as shown in FIG. 2B are discretely provided among the normal pixels constituting the pixel array 200. In addition, a plurality of types of pixels divided differently may be included in the pixel array 200.

Furthermore, the pixels under the unit pixel do not necessarily have to be divided. For example, the left half of some pixels in the pixel array 200 is shielded, and the right half of some other pixels is shielded. In this case, signals for phase difference detection are obtained based on the signals of different pixels.

Further, in the present embodiment, since the on-imaging plane phase difference AF is described as an example of the processing performed by the DSP 108, the image sensor 106 has the above-described configuration, however the present invention is not limited to this. For example, when the on-imaging plane phase difference AF is not performed and the DSP 108 performs other calculations, the unit pixel may not have a plurality of photodiodes.

FIG. 2C shows a detailed circuit configuration of the image sensor 106. In the pixel array 200, a plurality of unit pixels 201, (m+1) unit pixels 201 in the horizontal direction and (n+1) unit pixels 201 in the vertical direction, are arranged. A timing generator (TG) 210 supplies control pulses to each circuit block in accordance with the settings programmed by the CPU 110.

A vertical scanning circuit 209 controls the charge accumulation period in each pixel by sending a pulse to each pixel (electronic shutter). First, the PDs 203a and 203b are reset to a power supply potential VDD by simultaneously turning on the reset switch 206 and the transfer switches 204a and 204b. In this state, by turning off the transfer switches 204a and 204b, charge accumulation is started in the PDs 203a and 203b. Then, the reset switch 206 is turned off to end resetting the FD 205, and then the transfer switches 204a and 204b are turned on to transfer the accumulated charge. Then, the pixel signal corresponding to the transferred charge is output to the vertical output line 211. In addition, specific pixels may be selected, and pixel driving methods may be switched between the method for selected pixels and the method for non-selected pixels. Although the TG 210 is incorporated in the image sensor 106 in this embodiment, the TG 210 may be disposed outside the image sensor 106.

The pixel signals obtained by photoelectric conversion in each unit pixel 201 are output to the vertical output line 211 row by row by the drive signal supplied from the vertical scanning circuit 209 as described above. The constant current source 212 is combined with the pixel amplifier transistor 207 described above to form a source follower circuit. A readout circuit 213 has a function of amplifying the pixel signal output to the vertical output line 211 of each column. An AD converter circuit (ADC) 214 converts the output of the readout circuit 213 into a digital signal. The digital signals converted by the ADC 214 are sequentially selected by a horizontal scanning circuit 215 and output from an output circuit 216 to the outside of the image sensor 106 as image data.

In the present embodiment, it is possible to output signals from the pixel array 200 in various orders by using the electronic shutter function. For example, there is a method of performing charge accumulation and signal output sequentially from the top or bottom of the screen. As another example, charge accumulation and signal output are repeatedly performed by first skipping one or more rows, then subjecting the skipped rows, while shifting the rows, thereby consequently obtaining pixel signals of all the pixels of the image array 200. More specifically, signals are obtained from two consecutive even-numbered rows, then signals are obtained from two consecutive odd-numbered rows, one of which is in between the aforesaid two consecutive even-numbered rows, and these operations are alternately performed. Other various signal output methods may be used, and any signal output method may be used as long as an apparent gap does not appear in the obtained image.

Figure 3:
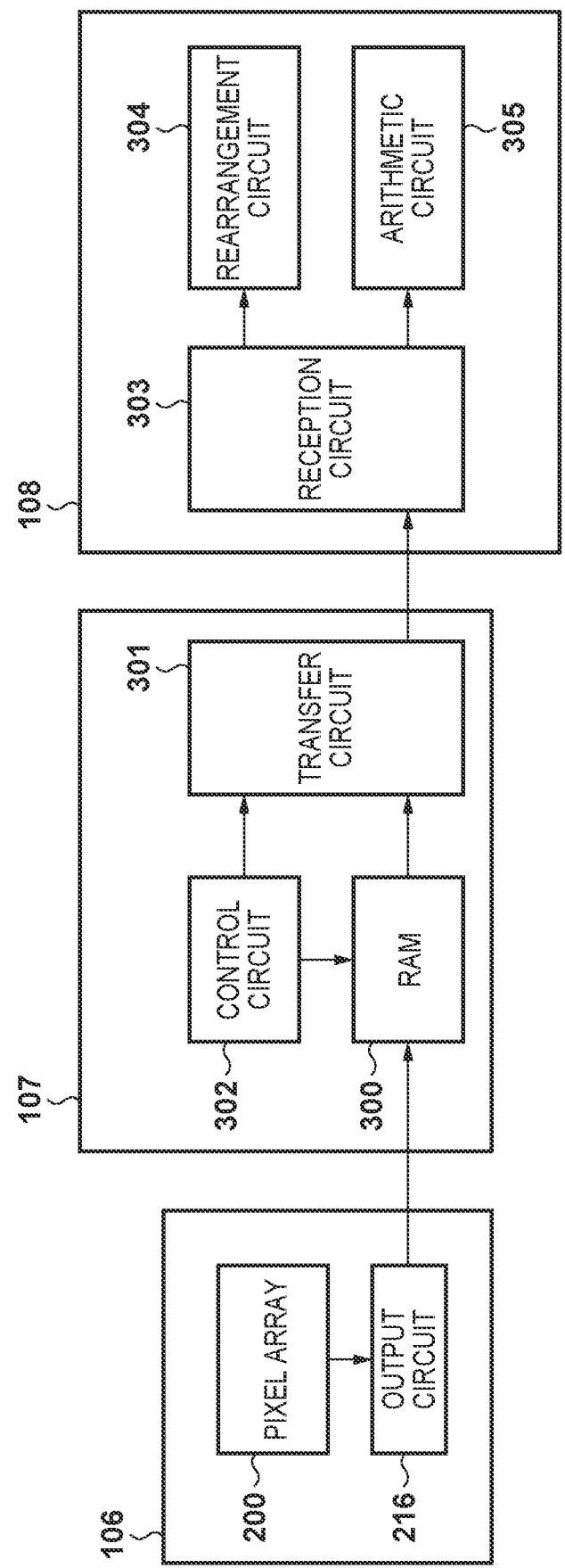
FIG. 3 is a block diagram showing an internal configuration of an image sensor, a front end, and a DSP according to a first embodiment.

Next, detailed configurations of the image sensor 106, the front end 107, and the DSP 108 in the first embodiment will be described with reference to FIG. 3. The front end 107 includes a RAM 300 which plays a role of a memory incorporated in the front end 107 described above. The RAM 300 stores at least one frame of image data output from the output circuit 216 of the image sensor 106. Although the memory included in the front end 107 is a RAM in this embodiment, other types of memory may be used as long as the memory has a sufficiently fast access speed and no problem in operation. A transfer circuit 301 transfers the image data stored in the RAM 300 to the DSP 108. A control circuit 302 controls the RAM 300 and the transfer circuit 301 to control the transfer order of image data.

The DSP 108 incorporates a reception circuit 303, and sends the image data transferred from the transfer circuit 301 to a rearrangement circuit 304 and an arithmetic circuit 305. The rearrangement circuit 304 changes the order of the image data sent from the transfer circuit 301 to, for example, the physical arrangement order of the unit pixel 201 of the pixel array 200 or the order suitable for the processing circuit (not shown) in the subsequent stage. The arithmetic circuit 305 can perform various arithmetic operations based on image data. In the following description, as an example, a case where A image data and B image data are generated from the above-mentioned A signals and B signals, and correlation calculation of the obtained A image data and B image data is performed to obtain the defocus amount for driving the second lens 102 and the third lens 103 will be described.

In addition, the arithmetic circuit 305 can perform an operation of generating an image to be displayed on the display 111, an operation of generating a defocus map for obtaining depth information of the image from the A image data and B image data, a tracking operation for detecting motion of a subject, AE calculation for controlling exposure, and so forth. Further, WB calculation for correcting the white balance of the image, calculation for detecting the flicker of the image, light adjustment calculation for determining the light emission amount of a flash light, for example, are conceivable. Note that the operations that can be performed by the arithmetic circuit 305 are not limited by the configurations or to the operations described above.

Note that, as represented by the above-described correlation calculation, the operation performed by the arithmetic circuit 305 in the DSP 108 does not necessarily require information on the entire screen. FIG. 4 is an example showing an area used for calculation in the entire screen. Here, an entire screen 400 shows, for example, the entire pixel array 200, but may also be a partial region of the pixel array 200 in a case where signals from a part of the pixels of the pixel array 200 are cropped and output.

A distance measurement frame 401 is, for example, an area where a subject set via the operation circuit 112 exists, and the arithmetic circuit 305 performs correlation calculation using image signals output from the unit pixels 201 in this frame. At that time, for example, vertical scanning circuit 209 can be used to select pixel rows to be used for the correlation calculation. Hereinafter, the unit pixels 201 included in the selected pixel rows are referred to as a first pixel group 402, and the unit pixels 201 included in the unselected pixel rows are referred to as a second pixel group 403. In this case, although the image data output from the first pixel group 402 is used for the calculation in the arithmetic circuit 305, the image data output from the second pixel group 403 is not used for the calculation.

Next, referring to the timing chart shown in FIG. 5, processing of, after taking an image, performing correlation calculation by the arithmetic circuit 305, driving the lens based on the result of the correction operation, and taking an image of the next frame, according to the first embodiment of the present invention will be described. First, charge accumulation is started at time t10, and output of image data obtained by converting a pixel signal corresponding to the accumulated charge into a digital signal is started at time t11. In the first embodiment, the period from releasing the reset of the PDs 203a and 203b to the output of the pixel signals corresponding to the charges to the outside of the unit pixel 201 corresponds to the charge accumulation period, i.e., the exposure time, and is sequentially controlled in units of row. At this time, image signals are obtained in a predetermined order regardless of whether the unit pixels 201 belong to the first pixel group 402 or the second pixel group 403. At the same time as the start of signal output, the output image data is sequentially stored in the RAM 300.

At time t12, at the same time when the storage of the image data output from the image sensor 106 into the RAM 300 is completed, the image data of the first pixel group 402 starts to be output from the RAM 300, and sequentially transferred from the transfer circuit 301 of the front end 107 to the DSP 108. Although part of the image data of the second pixel group 403 is output from the image sensor 106 prior to the image data of the first pixel group 402, but is not output and kept stored in the RAM 300 at this time. When transfer of all the image data corresponding to the first pixel group 402 is completed at time t13, the arithmetic circuit 305 in the DSP 108 starts performing correlation calculation. At the same time, transfer of the image data corresponding to the second pixel group 403 from the RAM 300 is started.

When the correlation calculation is completed at time t14, the CPU 110 starts driving the lens based on the result. When driving of the lens is completed at time t15, the next charge accumulation can be started, so that the charge accumulation of the next frame is simultaneously started. At time t16, transfer of the image data of the second pixel group 403 which was started at time t13 is completed. When the transfer is completed, shooting of one image is completed.

As described above, when the image data corresponding to the first pixel group 402 is transferred from the RAM 300 first, the reception order of the image data in the DSP 108 is switched with respect to the physical arrangement order of the unit pixel 201. Therefore, one image can be acquired by rearranging the transferred image data in the physical arrangement order of the unit pixel 201 in the rearrangement circuit 304.

According to the first embodiment as described above, it is possible to perform calculations necessary for shooting the next frame first, while performing acquisition of image data from an image sensor in the order that can reduce unnaturalness of an image. Therefore, it is possible to increase a frame rate while reducing unnaturalness of an image. The operation of the first embodiment is particularly effective in a case where the transfer rate from the front end 107 to the DSP 108 is slower than the transfer rate from the image sensor 106 to the RAM 109 in the front end 107.

In the first embodiment, an example in which only one DSP is provided has been described, but a plurality of DSPs may be provided to share each function. For example, a first DSP may perform correction processing of image data of the first pixel group 402 and the second pixel group 403, processing for displaying an image on the display 111, and processing for recording image data on the recording medium 113. A second DSP may perform correlation calculation using the A image data and the B image data of the first pixel group 402.

(Chip Configuration of Image Sensor 106 and Front End 107)

Figure 6A:
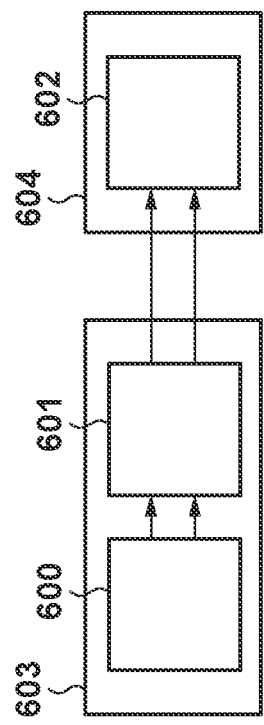
FIGS. 6A to 6C are diagrams showing examples of configurations of the image sensor according to the embodiments.
Figure 6B:
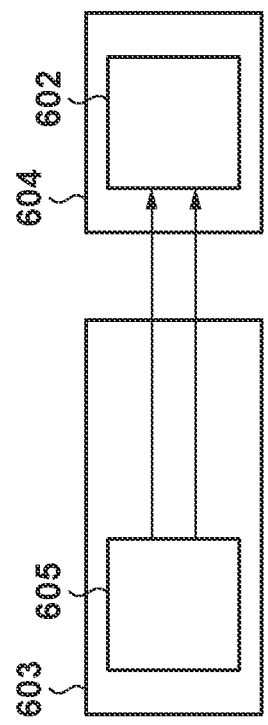
Figure 6C:
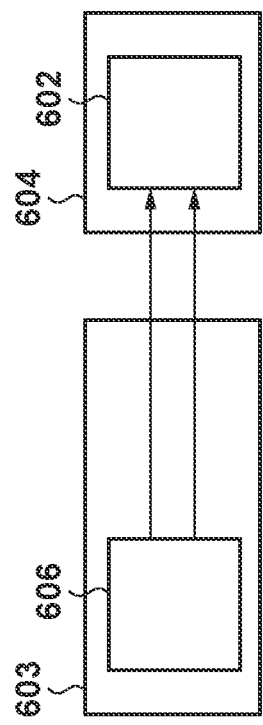

Several specific chip configurations of the image sensor 106 and the front end 107 are conceivable. FIGS. 6A to 6C show a plurality of specific examples of the chip configuration. FIG. 6A shows a configuration example 1, and an image sensor 106 is formed on a first semiconductor substrate to form a second chip 600, and a front end 107 is formed on a second semiconductor substrate to form a third chip 601. The two chips are mounted on a first electrical substrate 603 and are connected to a first chip 602 including at least the DSP 108 and mounted on a second electrical substrate 604.

FIG. 6B shows a configuration example 2. The image sensor 106 is formed on a third semiconductor substrate, the front end 107 is formed on a fourth semiconductor substrate, and a fourth chip 605 is formed by stacking them. The fourth chip 605 is mounted on the first electrical substrate 603 and connected to the first chip 602 including at least the DSP 108 and mounted on the second electrical substrate 604.

FIG. 6C shows a configuration example 3, in which an image sensor 106 and a front end 107 are formed on a fifth semiconductor substrate to form a fifth chip 606. The fifth chip 606 is mounted on the first electrical substrate 603 and connected to the first chip 602 including at least the DSP 108 and mounted on the second electrical substrate 604.

As described above, the configuration of the substrate or chip can be selected from various configurations including the above configurations, and the effect of the first embodiment does not change in any of these configurations.

Second Embodiment

Next, a second embodiment of the present invention will be described. In the first embodiment, the entire image data of one frame output from the image sensor 106 is temporarily stored in the RAM 300. After that, the image data corresponding to the first pixel group 402 is output from the RAM 300, and thereafter, the image data corresponding to the second pixel group 403 is output from the RAM 300 and transferred to the DSP 108. On the other hand, in the second embodiment, a transfer method in which at least a part of image data for one frame is not stored in the RAM 300 will be described.

FIG. 7 is a block diagram showing the configuration of the image sensor 106, the front end 107, and the DSP 108 in the second embodiment. In FIG. 7, the same components as those in FIG. 3 are denoted by the same reference numerals, and the description thereof will not be repeated. The front end 107 of the second embodiment is different from that of the first embodiment in that a router 700 and a selector 701 are added to the configuration shown in FIG. 3 and a control circuit 702 controls the router 700, the selector 701, and the RAM 300. The router 700 switches whether image data output from the image sensor 106 is stored in the RAM 300 or output to the selector 701 according to a control signal from the control circuit 702. The selector 701 switches whether image data to be transferred from the transfer circuit 301 is image data from the router 700 or image data from the RAM 300 according to a control signal from the control circuit 702. Note that the configuration of an image capturing apparatus of the second embodiment other than the above is the same as the configuration of the image capturing apparatus described with reference to FIGS. 1 and 2A to 2C, and thus the description thereof will be omitted.

In the second embodiment, the router 700 and the selector 701 will be described as being separately present in the front end 107. However, if, for example, the RAM 300 has a "through" function and it is possible to select a route capable of skipping read/write to/from the RAM 300, the router 700 and the selector 701 may not be added. Further, any other configuration is possible without departing from the scope of the present invention.

FIG. 8 is a timing chart showing processing in the second embodiment, which shows an example in which image data corresponding to the first pixel group 402 is transferred without being stored in the RAM 300, and then image data of the second pixel group 403 is transferred from the RAM 300. First, charge accumulation is started at time t20, and output of image data is started at time t21. At this time, the image data is acquired in a predetermined order regardless of whether the unit pixel 201 belongs to the first pixel group 402 or the second pixel group 403. Here, as shown in FIG. 4, it is assumed that the distance measurement frame 401 is in the middle part of the screen, and the image data is sequentially output in units of row from the top to the bottom of the screen. In this case, simultaneously with the output of the image data, the control circuit 702 controls the router 700 to store the image data output from the second pixel group 403 in the RAM 300.

At time t22, when the output of the image data of the first pixel group 402 is started, the control circuit 702 controls the router 700 and the selector 701 so that the transfer to the DSP 108 can be started without storing the image data in the RAM 300. Then, transfer of image data of the first pixel group 402 to the DSP 108 is started. However, when the output rate of the transfer circuit 301 of the front end 107 is slower than the output rate of the output circuit 216 of the image sensor 106, part of the image data of the first pixel group 402 may be stored in the RAM 300. That is, in this case, it is controlled so that the image data output from at least a part of the pixels in the first pixel group 402 is stored in the RAM 300 and output at the transfer rate of the front end 107.

At time t23, the output of all the image data and the storage of the image data from the second pixel group 403 and part of the image data of the first pixel group 402 in the RAM 300 are completed, and at this time, transfer of the image data of the first pixel group 402 has been completed halfway. When transfer of the image data of the first pixel group 402 is completed at time t24, the correlation calculation can be started from this time. At the same time, transfer of image data of the second pixel group 403 is started.

When the correlation calculation is completed at time t25, the CPU 110 starts driving the lens based on the result of the correlation calculation. When driving of the lens is completed at time t26, the image capturing apparatus becomes ready for the next charge accumulation, and charge accumulation of the next frame is started simultaneously. At time t27, transfer of the image data of the second pixel group 403 whose transfer has been started at time t24 is completed. In the process shown in FIG. 8, it is possible to finish the correlation calculation at an earlier timing than the process shown in FIG. 5 described in the first embodiment.

As described above, according to the second embodiment, the correlation calculation can be completed earlier. As a result, since the start timing of charge accumulation of the next frame can be advanced, the frame rate of image can be improved.

It should be noted that, as described above, when the image data corresponding to the first pixel group 402 is transferred first, the reception order of the image data in the DSP 108 is switched from the physical arrangement order of the unit pixel 201. Therefore, one image can be acquired by rearranging the transferred image data in the physical arrangement order of the unit pixel 201 in the rearrangement circuit 304.

Third Embodiment

Figure 9:
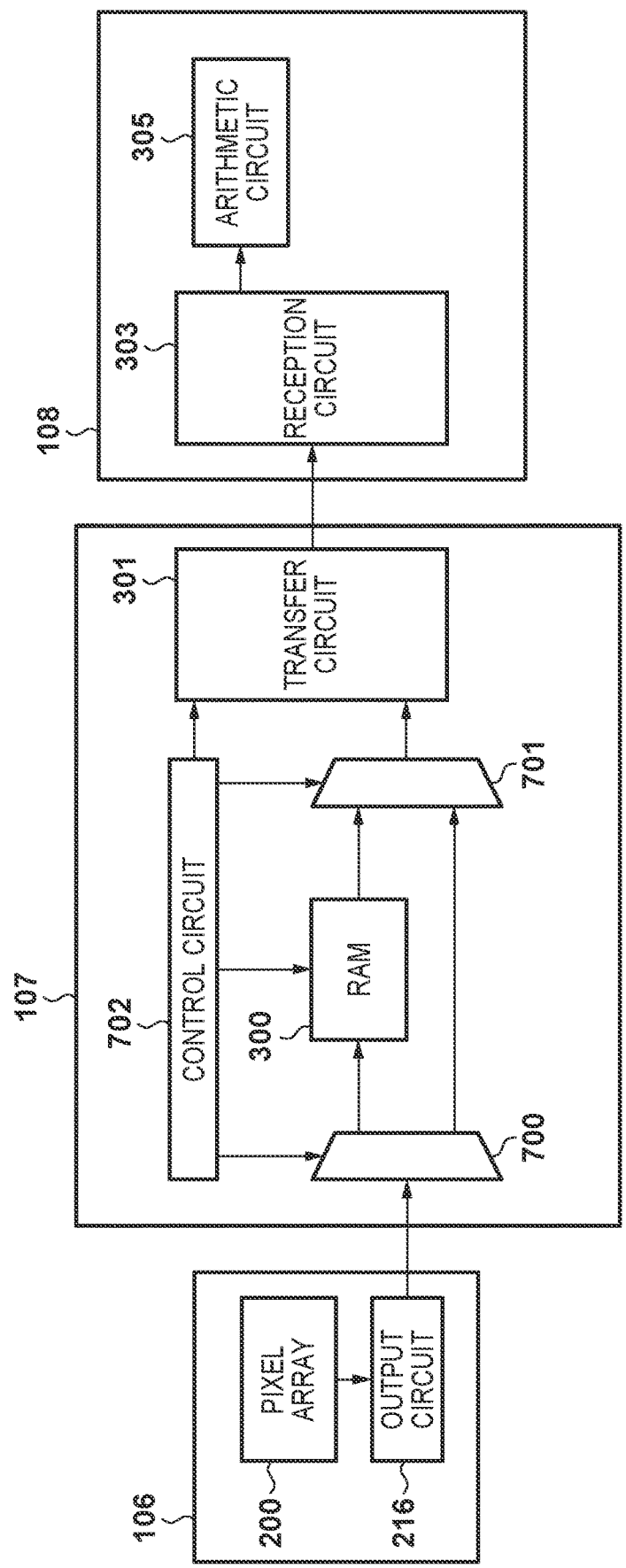
FIG. 9 is a block diagram showing an internal configuration of an image sensor, a front end, and a DSP according to a third embodiment.

Next, a third embodiment of the present invention will be described. FIG. 9 is a block diagram showing the configuration of the image sensor 106, the front end 107, and the DSP 108 in the third embodiment. The configuration shown in FIG. 9 shows the case where there is no rearrangement circuit 304 in the configuration shown in FIG. 7. In FIG. 9, the same components as in FIG. 7 will be assigned the same reference numerals and descriptions thereof will be omitted as appropriate. Note that the configuration of an image capturing apparatus of the third embodiment other than the above is the same as the configuration of the image capturing apparatus described with reference to FIGS. 1 and 2A to 2C, and thus the description thereof will be omitted.

Figure 10:
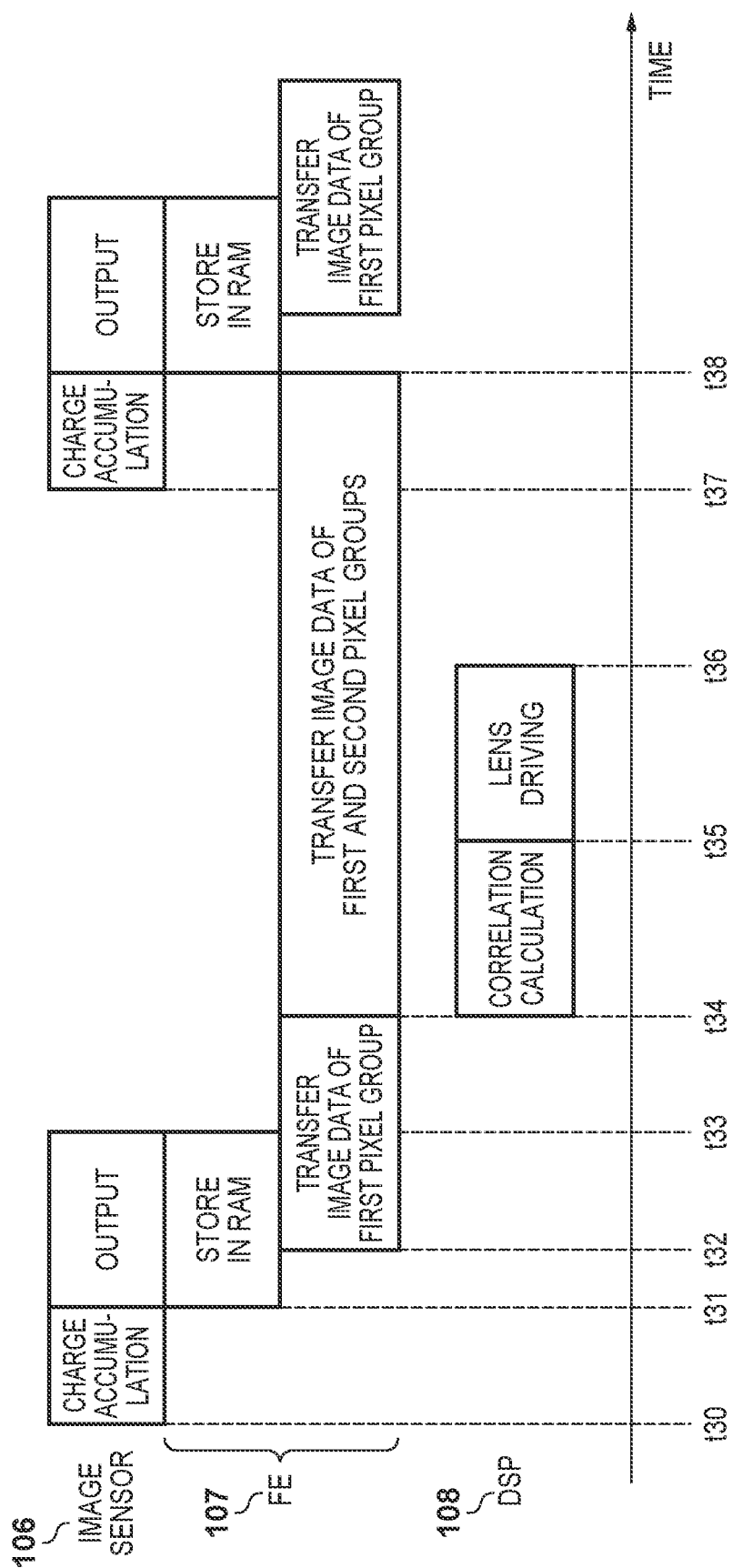
FIG. 10 is a timing chart showing processing according to the third embodiment.

FIG. 10 is a timing chart showing processing in the third embodiment. In the third embodiment, similar to the method described with reference to FIG. 8 in the second embodiment, the image data of the first pixel group 402 is transferred immediately after being output, but all of the image data of the first pixel group 402 is stored in the RAM 300. Then, after the transmission of the image data of the first pixel group 402 is completed, the image data of the first pixel group 402 is transferred again with the image data of the second pixel group 403.

Charge accumulation is started at time t30, and output of image data is started at time t31. At this time, the image data is acquired in a predetermined order regardless of whether the unit pixel 201 belongs to the first pixel group 402 or the second pixel group 403. At the same time, storage of output image data into the RAM 300 is started. Here, as shown in FIG. 4, it is assumed that the distance measurement frame 401 is in the middle part of the screen, and the image signal is sequentially output in units of row from the top to the bottom of the screen.

At time t32, output of pixel data of the first pixel group 402 is started. At this time, the control circuit 702 controls the router 700 and the selector 701 so that the image data can be stored in the RAM 300 while transferring the image data to the DSP 108, and transfer of the image data of the first pixel group 402 to the DSP 108 is started. At time t33, storage of all image data in the RAM 300 is completed, and at this time, transfer of the image data of the first pixel group 402 has been completed halfway. When transfer of the image data of the first pixel group 402 is completed at time t34, the correlation calculation can be started from this time.

In the transfer of the image data of the first pixel group 402 and the second pixel group 403 starting from the time t34, the order of the image data stored in the RAM 300 can be rearranged and transferred. For example, by rearranging and transferring the image data in the order of the pixels in the pixel array 200, the image data can be output in an appropriate order without the rearrangement circuit 304 for rearranging the image in the DSP 108.

When the correlation calculation is completed at time t35, the CPU 110 starts driving the lens based on the result of the correlation calculation, and the driving of the lens is completed at time t36. However, at this point in time, since transfer of the image data from the RAM 300 has not completed yet, if image storage starts immediately, the image data of the next frame cannot be stored in the RAM 300. Therefore, the start of accumulation at time t37 is controlled so that output of image data is not started until transfer of image data from the RAM 300 is completed at time t38. Then, as soon as transfer of image data from the RAM 300 is completed at time t38, output of image data of the next frame is started.

As described above, according to the third embodiment, even with the configuration in which the rearrangement circuit 304 is not provided in the DSP 108, the start timing of correlation calculation can be advanced, and the unnaturalness of the image can be reduced.

In the first to third embodiments, it is described that the correlation calculation is started after the transfer of all of the image data of the first pixel group 402 is completed. However the present invention is not limited to this, and if the correlation calculation can be started with image data of only part of the first pixel group 402, it is not necessary to wait for all the image data of the first pixel group 402 being transferred before starting the correlation calculation, and the correlation calculation may be started as soon as the image data necessary for the correlation calculation becomes ready.

Fourth Embodiment

Next, a fourth embodiment of the present invention will be described. In the first to third embodiments, the arithmetic circuit 305 performs only one type of correlation calculation, and the example in which the image signal used for the calculation is one type is disclosed. However, as mentioned above, in general, there are multiple types of calculations performed by the arithmetic circuit 305. In a system in which a plurality of calculations coexist, it is conceivable to use image signals having different properties depending on the purpose of the calculations. The configuration of the image capturing apparatus according to the fourth embodiment may have any configuration of the image capturing apparatus used in the first to third embodiments, and thus the description thereof is omitted here. However, in the following description, it is assumed that the image sensor 106, the front end 107, and the DSP 108 have the configuration shown in FIG. 3 and the image signal is sequentially output in units of row from the top to the bottom of the screen.

FIG. 11 is an example showing a plurality of types of areas used for calculations in the entire screen. In FIG. 11, the same components as those in FIG. 4 are denoted by the same reference numerals. In the fourth embodiment, it is assumed that live view (LV) display image generation (first calculation) and correlation calculation (second calculation) are performed in the arithmetic circuit 305. In the first calculation, the image data of the entire screen is required and a low resolution is acceptable, and in the second calculation, image data of high resolution only in the area corresponding to the distance measurement frame 401 is required. Thus, the image data used for these two types of calculations are different in nature.

In FIG. 11, a third pixel group 900 used for the first calculation is represented by a broken line, and as described above, is distributed at a low resolution over the entire screen. On the other hand, the first pixel group 402 used for the second calculation is expressed by a hatched area, and is distributed at high resolution in the area where the distance measurement frame 401 exists, as described above.

FIG. 12 is a timing chart showing processing in the fourth embodiment. First, charge accumulation is started at time t40, and output of image data is started at time t41. Note that the image data is acquired in a predetermined order regardless of whether the unit pixel 201 belongs to the first pixel group 402, the second pixel group, 403 or the third pixel group 900. At the same time as the start of output, storage of the output image data into the RAM 300 is started.

At time t42, as soon as storage of the image data output from the image sensor 106 into the RAM 300 is completed, transfer of image data of the third pixel group 900 to be used for the first calculation is started. When transfer of the image data of the third pixel group 900 is completed at time t43, the first calculation (LV display image generation) is performed in the arithmetic circuit 305, and the image generated by this calculation can be displayed on the display 111.

At time t43, transfer of image data used for the second calculation is simultaneously started. At time t44, transfer of the image data used for the second calculation is completed, and at this time, the second calculation (correlation calculation) is started in the arithmetic circuit 305. At time t46, the second calculation is completed, and lens driving can be started. As lens driving is completed at time t47, accumulation of an image to be output in the next frame can be started. At time t48, transfer of the image data of the second pixel group 403 is ended, and image shooting of one frame is ended.

As described above, according to the fourth embodiment, in a case where a plurality of different calculations are performed in the arithmetic circuit 305 in the DSP 108, a method of transferring image data in the order to be used in the calculations is described. By this method, in a case where a plurality of different calculations are to be performed, it is possible to transfer image data so as to shorten the time until all the calculations are completed.

Further, the transfer order of the image data may be selected according to the configuration of the image capturing apparatus, such that the image data of the first pixel group 402 may be transferred earlier than the image data of the third pixel group 900, and the present invention is not limited to the transfer orders described above. Further, in the fourth embodiment, too, a plurality of DSPs may be provided to share the respective functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-129459, filed on Jul. 6, 2018 and No. 2019-104796, filed on Jun. 4, 2019 which are hereby incorporated by reference herein in their entirety.

What is claimed is:

1. An image capturing apparatus comprising:
a pixel array that has a plurality of pixels each having a plurality of photoelectric conversion portions and one microlens; and
one or more processors and/or circuitry which functions as:
a driver that drives the pixel array;
a memory that stores image data output from the pixel array;
at least one image processor that performs a first operation and a second operation, wherein the first operation includes a calculation which uses first image data that is part of the image data, and the second operation includes processing, performed on the image data, for obtaining an image; and
a controller that controls transfer of the image data output from the pixel array to the memory and the image processor,
wherein the controller controls to transfer at least part of the first image data among the image data output from the pixel array to the image processor without storing the part in the memory, store a rest of the first image data, and second image data of the image data output from the pixel array, in the memory, and transfer the rest of the first image data and the second image data to the image processor from the memory, and
the driver drives the pixel array so as to output the image data in a predetermined order which is different from an order of transferring the first image data and the second image data to the image processor.

2. The image capturing apparatus according to claim 1, wherein the image processor further comprises one or more processors and/or circuitry which functions as a rearranging unit that rearranges an order of the transferred image data.

3. The image capturing apparatus according to claim 1, wherein the first operation includes a correlation calculation, a calculation for generating an image to be displayed, a calculation for generating a defocus map, a calculation for tracking a subject, a calculation for controlling exposure, a calculation for determining white balance, a calculation for detecting a flicker, and a calculation for determining an emission amount of flash light.

4. An image capturing apparatus comprising:
a pixel array that has a plurality of pixels each having a plurality of photoelectric conversion portions and one microlens; and
one or more processors and/or circuitry which functions as:
a driver that drives the pixel array;
a memory that stores image data output from the pixel array;
at least one image processor that performs a first operation, a second operation, and a third operation, wherein the first operation includes a calculation which uses first image data that is part of the image data, the second operation includes processing, performed on the image data, for obtaining an image, and the third operation includes a calculation using third image data that is part of the image data and different from the first image data; and
a controller that controls transfer of the image data output from the pixel array to the memory and the image processor,
wherein the controller controls to transfer at least part of the first and third image data among the image data output from the pixel array to the image processor without storing the part in the memory, store a rest of the first and third image data and the second image data in the memory, and transfer the rest of the first and third image data and the second image data to the image processor from the memory, and the driver drives the pixel array so as to output the image data in a predetermined order which is different from an order of transferring the first image data and the second image data to the image processor.

5. The image capturing apparatus according to claim 4, wherein the third operation includes a correlation calculation, a calculation for generating an image to be displayed, a calculation for generating a defocus map, a calculation for tracking a subject, a calculation for controlling exposure, a calculation for determining white balance, a calculation for detecting a flicker, and a calculation for determining an emission amount of flash light, and is different from the first operation.

6. The image capturing apparatus according to claim 4, wherein the image processor further comprises one or more processors and/or circuitry which functions as a rearranging unit that rearranges an order of the transferred image data.

7. The image capturing apparatus according to claim 4, wherein the first operation includes a correlation calculation, a calculation for generating an image to be displayed, a calculation for generating a defocus map, a calculation for tracking a subject, a calculation for controlling exposure, a calculation for determining white balance, a calculation for detecting a flicker, and a calculation for determining an emission amount of flash light.

8. An image capturing apparatus comprising:
   a pixel array that has a plurality of pixels each having a plurality of photoelectric conversion portions and one microlens; and
   one or more processors and/or circuitry which functions as:
      a driver that drives the pixel array;
      a memory that stores image data output from the pixel array;
      at least one image processor that performs a first operation and a second operation, wherein the first operation includes a calculation which uses first image data that is part of the image data output from the pixel array, and the second operation includes processing, performed on the image data output from the pixel array, for obtaining an image; and
      a controller that controls transfer of the image data output from the pixel array to the memory and the image processor,
   wherein the controller controls to store all the image data output from the pixel array in the memory, transfer the first image data to the image processor while storing the first image data in the memory, and after transferring the first image data, transfer the first and second image data to the image processor from the memory in a predetermined order, and
   the driver drives the pixel array so as to output the image data in a predetermined order which is different from an order of transferring the first image data and the second image data to the image processor.

9. The image capturing apparatus according to claim 8, wherein the image processor further performs a third operation that includes a calculation using third image data which is part of the image data output from the pixel array and different from the first image data, and
   the controller further controls to transfer the third image data to the image processor while storing the third image data in the memory, and after transferring the first and third image data, transfer the first, second and third image data to the image processor from the memory in a predetermined order.

10. The image capturing apparatus according to claim 9, wherein the third operation includes a correlation calculation, a calculation for generating an image to be displayed, a calculation for generating a defocus map, a calculation for tracking a subject, a calculation for controlling exposure, a calculation for determining white balance, a calculation for detecting a flicker, and a calculation for determining an emission amount of flash light, and is different from the first operation.

11. The image capturing apparatus according to claim 8, wherein the first operation includes a correlation calculation, a calculation for generating an image to be displayed, a calculation for generating a defocus map, a calculation for tracking a subject, a calculation for controlling exposure, a calculation for determining white balance, a calculation for detecting a flicker, and a calculation for determining an emission amount of flash light.

\* \* \* \* \*